(12) United States Patent
Mermerkaya

(10) Patent No.: US 11,398,076 B2
(45) Date of Patent: Jul. 26, 2022

(54) THREE DIMENSIONAL MEDIA STREAMING AND BROADCASTING SYSTEM AND METHOD

(71) Applicant: KARINCA TEKNOLOJI VE ILET. SAN. TIC. LTD. STI, Ankara (TR)

(72) Inventor: Hamit Mermerkaya, Eskisehir (TR)

( * ) Notice: Subject to any disclaimer, the term of this patent is extended or adjusted under 35 U.S.C. 154(b) by 0 days.

(21) Appl. No.: 17/281,144

(22) PCT Filed: Oct. 7, 2019

(86) PCT No.: PCT/TR2019/050830
§ 371 (c)(1),
(2) Date: Mar. 29, 2021

(87) PCT Pub. No.: WO2021/006836
PCT Pub. Date: Jan. 14, 2021

(65) Prior Publication Data
US 2021/0343081 A1    Nov. 4, 2021

(30) Foreign Application Priority Data
Jul. 5, 2019   (TR) ................................ 2019/10049

(51) Int. Cl.
| | | |
|---|---|---|
| *G06T 17/20* | (2006.01) |
| *G06T 7/55* | (2017.01) |
| *H04N 13/271* | (2018.01) |
| *H04N 13/344* | (2018.01) |
| *G06T 13/40* | (2011.01) |
| *H04N 21/2187* | (2011.01) |
| *H04N 13/00* | (2018.01) |

(52) U.S. Cl.
CPC ............. *G06T 17/20* (2013.01); *G06T 7/55* (2017.01); *G06T 13/40* (2013.01); *H04N 13/271* (2018.05); *H04N 13/344* (2018.05); *H04N 21/2187* (2013.01); *G06T 2207/10028* (2013.01); *H04N 2013/0096* (2013.01)

(58) Field of Classification Search
CPC ........... G06T 17/20; G06T 7/55; G06T 13/40; G06T 2207/10028; H04N 13/271; H04N 13/344; H04N 21/2187; H04N 2013/0096
See application file for complete search history.

(56) References Cited

U.S. PATENT DOCUMENTS

| | | | | |
|---|---|---|---|---|
| 2005/0277466 A1* | 12/2005 | Lock | ...................... | H04N 5/272 463/30 |
| 2008/0192116 A1* | 8/2008 | Tamir | ...................... | G06T 7/292 348/157 |

(Continued)

OTHER PUBLICATIONS

Kimata, Hideaki, "Interactive 3D Multi-Angle Live Streaming System" 2011, "IEEE 15th International Symposium on Consumer Electronics" pp. 576-579 (Year: 2011).*

(Continued)

*Primary Examiner* — Terrell M Robinson
(74) *Attorney, Agent, or Firm* — Egbert, McDaniel & Swartz, PLLC

(57) ABSTRACT

A three-dimensional media streaming and broadcasting system and method, which enables different media, such as concerts and sports events, to be transferred in a live and three-dimensional manner, and the transferred image to be broadcast and viewed with devices such as virtual reality goggles.

9 Claims, 2 Drawing Sheets

(56) References Cited

U.S. PATENT DOCUMENTS

| | | | |
|---|---|---|---|
| 2012/0195471 A1 | 8/2012 | Newcombe | |
| 2014/0098185 A1* | 4/2014 | Davari | H04N 7/00 |
| | | | 348/E7.001 |
| 2017/0094259 A1* | 3/2017 | Kouperman | H04N 13/111 |
| 2018/0356526 A1 | 12/2018 | Wang et al. | |
| 2019/0102913 A1 | 4/2019 | Madison et al. | |
| 2019/0109957 A1* | 4/2019 | Date | B41J 29/393 |
| 2020/0349672 A1* | 11/2020 | Cochran | G06T 15/08 |
| 2021/0319623 A1* | 10/2021 | Ninan | A63F 13/26 |

OTHER PUBLICATIONS

International Search Report for corresponding PCT/TR2019/050830, dated Feb. 9, 2021.
Written Opinion of the International Searching Authority for corresponding PCT/TR2019/050830, dated Feb. 9, 2021.

\* cited by examiner

THREE DIMENSIONAL MEDIA STREAMING AND BROADCASTING SYSTEM AND METHOD

FIELD OF THE INVENTION

The present invention relates to a three-dimensional media streaming and broadcasting system and method, which enables different media, such as concerts and sports events, to be transferred in a live and three-dimensional manner, and the transferred image to be broadcast and viewed with devices such as virtual reality goggles.

BACKGROUND OF THE INVENTION

A lot of events such as concerts, festivals, sports competitions and conferences are held in many parts of the world. In order to attend the said events, people go to the venues where the events are held and buy the event ticket to attend the event. People prefer to attend and watch the events live as much as possible, because viewing, watching, and feeling the venue where the event is held live and in three dimensions and following the events in three dimensions enable people to feel and live the event with all the excitement. However, it is not always possible to watch all events at the venue. People are not always able to physically attend the events that are held in different cities, countries and places. It is not always feasible in terms of time and cost to be able to physically attend the events and watch them live. When people cannot attend the events in which they are interested, they watch the video recording of the said event. However, watching the video recording of the event does not provide sufficient satisfaction to the viewer. When the viewers watch the event videos, they cannot feel the excitement, feelings and emotions they experience at the event site. The most important reasons of this are that the event is not viewed in three-dimensions (3D), the event site and the performers are not viewed in three dimensions, and the viewer cannot see every area at the event site that s/he prefers. The present patent application enables the events such as concerts, sports competitions and conferences to be viewed live and in three dimensions allowing the viewer to view the entire event site. The present patent application enables to view the events live via a three dimensional media streaming technology.

Today, there are very few studies on transmitting events in three dimensions and viewing the entire event in three dimensions. One of the current applications is a system structure developed by Intel in a similar technical field. However, the way of operation and structure of the said system is very different. In the said system, in addition to the normal 2D broadcasting from the site where the event takes place, images of important moments are captured by using dozens of 5K two-dimensional (2D) cameras that will cover 360 degrees, and point cloud is created by using photogrammetry techniques and 3D image is obtained in the final stage; and this instant 3D image is incorporated to the broadcast during the normal broadcasting. For example, when broadcasting a basketball game, at the time of shooting a basket, which is one of the most important moments, the said system incorporates the instant 3D image taken from the event site into the in the normal broadcast thereby enabling only that moment to be viewed from different angles and depths. In the said system, 3D images of only the important moments are provided.

With the state-of-the-art technology, it is not possible to stream and broadcast all moments of any event live and in 3 dimensions, and to enable the users to watch the event in 3 dimensions, because processors with a very high processing volume are required for to perform all these processes. The system and method structure proposed in the present patent application enables to perform three-dimensional video streaming and all of the said processes.

The present patent application relates to media streaming and broadcasting in 3 dimensions. The system and method described in the present patent application enables 3 dimensional streaming and broadcasting of events especially such as concerts, large parties, sports competitions, football and basketball matches, and meetings. Users who join the system will be able to attend the event of their choice with virtual reality goggles, and will be able to watch the entire event live and in three dimensions by means of virtual reality goggles or a similar technology independent from the location where the event takes place.

Objects of the Invention

The object of the present invention is to provide a three-dimensional media streaming and broadcasting system and method, which enable many different event media such as concerts and sports competitions to be streamed live and in three dimensions, and the streamed media to be broadcast for being viewed via different devices.

Another object of the present invention is to provide a three-dimensional media streaming and broadcasting system and method, which enable many different event media such as concerts and sports competitions to be streamed via the current technology.

A further object of the present invention is to provide a three-dimensional media streaming and broadcasting system and method, which enable the viewers to view the events in three dimensions with all the details taking place at the event venue at that time and enables the live performance excitement experienced at the event venue to be experienced out of the event venue.

DETAILED DESCRIPTION OF THE INVENTION

The three dimensional media streaming and broadcasting system and method developed to fulfill the object of the present invention are illustrated in the accompanying figures, in which.

Figure 1:
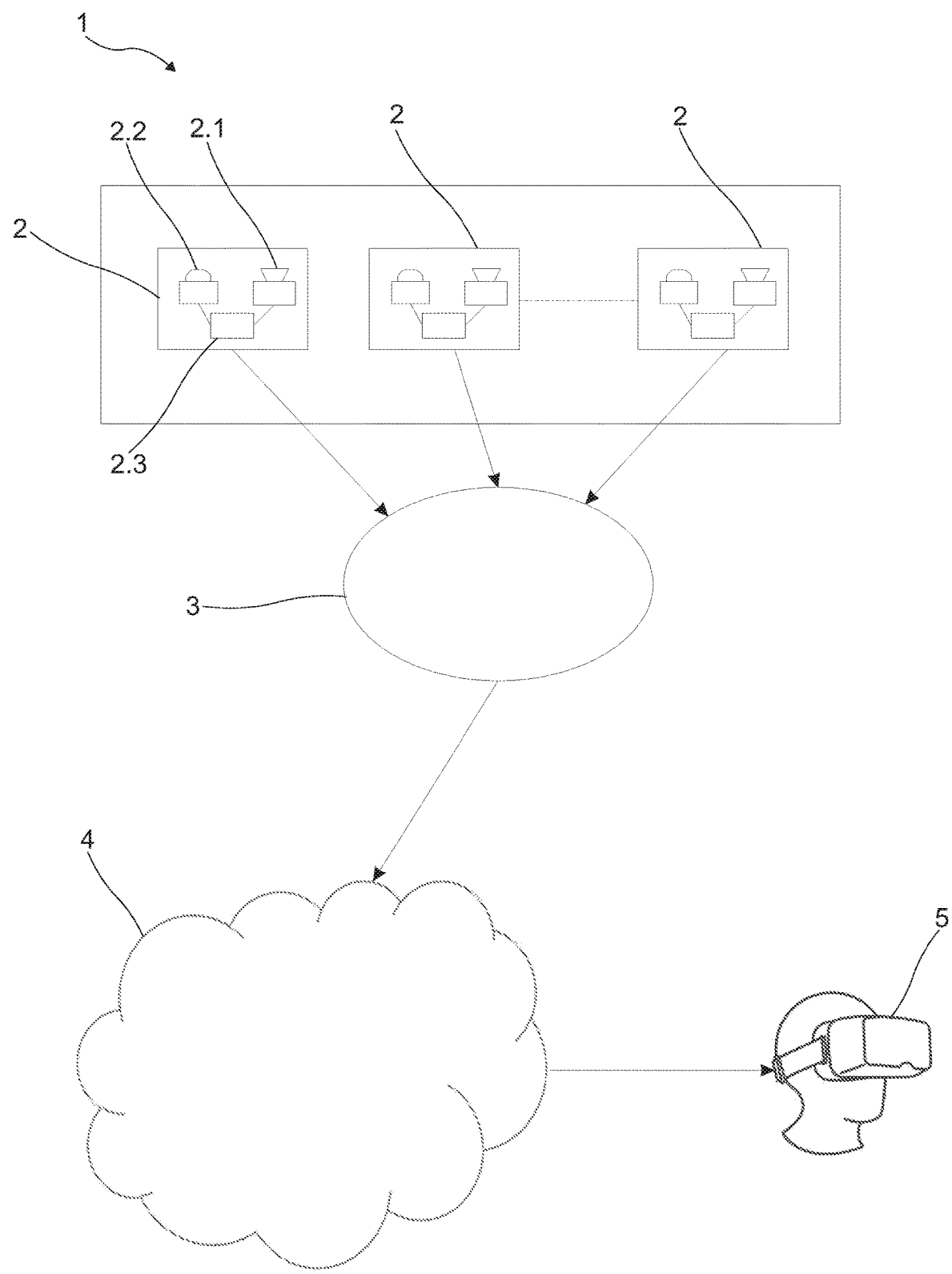
FIG. 1 is a schematic view of the three dimensional media streaming and broadcasting system.
Figure 2:
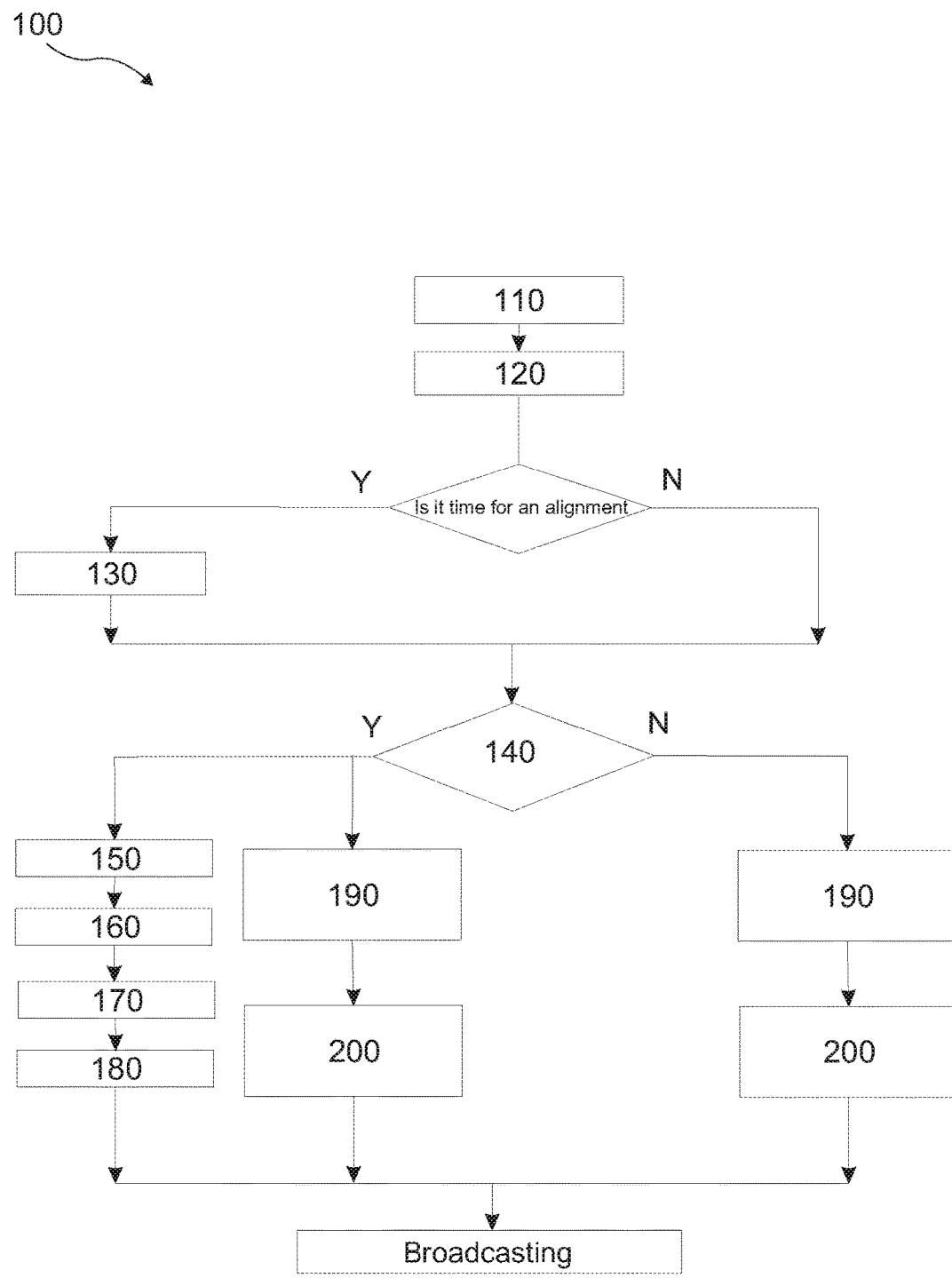
FIG. 2 is a schematic view of the three dimensional media streaming and broadcasting method.

The components in the figures are given reference numbers as follows:

1. Three dimensional media streaming and broadcasting system
2. Camera set
   2.1 Depth-sensing camera
   2.2 Color camera
   2.3 Computing module
3. Internet connection
4. Server
5. Monitoring device
100. Three dimensional media streaming and broadcasting method
S. Scene The three dimensional media streaming and broadcasting system (1) and method (100) of the present invention enables to receive all the images, depth and color information from the site where any event takes place and transmitted to the preferred place through Internet. During the event, the images of the important places such as the scene, arena where the event takes place and athletes and artists, who are the main elements of the event, can be transferred and watched in three dimensions. While the areas and elements such as spectators and the other places out of scene/arena cannot be watched live in three dimensions, it is because the cams can not cover them in fully 360 degree manner.

By means of the three dimensional media streaming and broadcasting system (1) and method (100) of the present invention, people can remotely watch the preferred events live and in three dimensions. Thus, any type of event, the event venue, preferably only the scene (S) can be viewed remotely with all the elements thereof, and preferably only those moving on the scene are animated. The users who want to view the event can monitor the event, the entire area of the event, all living and non-living objects in the event live and in 3D dimensions by using virtual reality goggles or similar monitoring devices (5) via three-dimensional media streaming and broadcasting system (1).

By means of the three dimensional media streaming and broadcasting system (1) and method (100) of the present invention, the users are able to remotely view the preferred events live and in three dimensions, and as the user is able to monitor the entire event venue live, s/he can feel the excitement of the environment and live that experience live.

In the three dimensional media streaming and broadcasting system (1) and method (100) of the present invention, a three dimensional image is captured from any preferred event venue, and after the said image is processed, it is broadcast upon being transferred to a preferred device via a monitoring device (5) such as virtual reality goggles. The most important feature provided by the invention is to stream and broadcast everything on the event venue live and in 3 dimensions and to enable this via current technology and processor powers.

The three dimensional media streaming and broadcasting system (1) of the present invention comprises a number of camera sets (2) adequate to cover the scene and the contents of the scene (the number of camera sets varies according to the size of the scene), an interne connection (3) and a server (4). The three dimensional media streaming and broadcasting system (1) of the present invention also comprises at least one monitoring device (5) or the monitoring devices (5) can be used by being integrated into the system (1).

The three-dimensional media streaming and broadcasting system (1), which enables different environments, such as concerts and sports events, to be transmitted live and in three dimensions, and the transmitted image to be broadcast and viewed with monitoring devices (5) such as virtual reality goggles, comprises the following:
  camera sets (2), which enable to capture images from the event venue in three dimensions, and include a depth-sensing camera (2.1), a color camera (2.2) and a computing module (2.3),
  a depth-sensing camera (2.1), which is adapted to compute depth information for each pixel within the field of vision, and captures depth images at up to 30 frames per second,
  a color camera (2.2) which is adapted to enable capturing colored image of the scene (S) that is recorded and the entire site that is captured at high resolution and high frame rate (fbs: frame per second),
  a computing module (2.3) with GPU capability, which is adapted to capture and compress the depth and color images received from the depth-sensing camera (2.1) and the color camera (2.2) simultaneously and after synchronizing, transmitting them to the server (4) via Internet connection (3),
  a server (4) which is adapted to form image frames by grouping all the camera depth and color images received from each camera set (2) within the same time interval,
  a server (4) which is adapted to create point clouds by computing the X, Y and Z coordinates corresponding to the pixels in the depth images for each of the grouped depth images coming from the depth-sensing cameras (2.1), and after creation of the point clouds, to enable obtaining the first key frame by aligning the point clouds of the other camera sets (2) according to a reference camera set (2) and creating a single integrated point cloud,
  a server (4), which is adapted to continuously renew the key frame within a preferred time period with the new images coming from the camera sets (2), and when new images are received from the camera set (2), to control whether they came within the period of key frame renewal time,
  a server (4), which, when the new images are received, is adapted to create the surface of the point cloud (mesh creation) if a new key frame is to be obtained, or if key frame will not be obtained and the old frame will be accepted, to determine the skeleton information of the living and objects moving on the key frame together with their joints and animating the living organisms and the objects moving on the current key frame according to their joints and to broadcasting the image.

In the three dimensional media streaming and broadcasting system (1), a camera set (22) is used for capturing images of the scene (S) where the event takes place and the entire event venue. The number of camera sets (2) varies according to the size of the event venue, in other words, the size of the scene (S); the quality of the cameras used; and the full 360 degree full coverage of the venue. In the preferred embodiment of the present invention, the scene (S) is monitored by at least ten camera sets (2) and the images of the environment are taken by at least ten camera sets (2). When the camera sets (2) are being placed at the event venue, the number and positons of the camera sets (2) to be used is determined such that preferably a full 360° image can be captured. The camera set (2) is portable and allows quick installation, and in different embodiments of the invention, the number of camera sets (2) may be as preferred.

The depth-sensing camera (2.1) provided in the camera set (2) enables detection of the depth of the shooting area, i.e. the scene (S). The depth-sensing camera (2.1) enables the image of all the people and objects in the scene (S) to be detected with depth. The depth-sensing camera (2.1) is preferably a 4D LiDAR camera and is able to uniquely merge digital video with LIDAR technology by capturing multi-megapixel images at up to 30 frames per second with accurate depth for each individual pixel. The depth-sensing camera (2.1) has the ability to process the location and motion of the object in the environment, in which it captures images, in real time and very rapidly.

The depth-sensing camera (2.2) provided in the camera set (2) enables the entire scene (S) that is shot to be displayed as color images. The color camera (2.2) has the ability of operation at high resolution and high frame rate (fbs: frame per second).

The computing module (CM) (2.2) provided in the camera set (2) processes depth and color images received from the depth-sensing camera (2.1) and the color camera (2.2).

The computing module (2.3) is adapted to capture and compress synchronized depth and color images and then transmitting them to the server (4) through Internet connection (3). The computing module (2.3) has graphic processing (GPU) capability, is power efficient and fitted to small size. The computing modules (2.3) capture the depth and color images coming from the depth-sensing cameras (2.1) and the color cameras (2.2), and are synchronized using an external trigger and receive data synchronously at the preferred time. All of the computing modules (2.3) are synchronized with the cloud-based server (4) externally via network time protocol (NTP). For example, in one embodiment of the invention, they are synchronized using an external trigger and the depth-sensing cameras (2.1) and the color cameras (2.2) capture images synchronously preferably at 30 frames per second (fbs). In one embodiment of the invention, the trigger operates within the server (4) and triggering function is performed by means of the server (4).

The depth and color images are synchronized by means of the computing module (2.3) provided in the camera set (2) and the synchronization. By means of the computing module (2.3), the camera set (2) transmits all the depth and color images to the server (4) through Internet connection (3) such that all the images are synchronized. The server (4) is preferably cloud-based. All of the depth and color images coming to the server (4) are synchronized.

In one embodiment of the invention, synchronization is as follows: All of the camera sets (2) are connected to the server (4) through internet connection (3). All of the camera sets (2) adjust their clocks according to the clock of the server (4) and thus all of the camera sets (2) are synchronized with each other. The camera sets (2) preferably start to capture images at the same time with the trigger provided in the server (4). Thus the server (4) is a reference point for synchronization.

The camera sets (2) capture 360 degree images of the scene (S) and transmit all of the images synchronously to the server (4). The server (4) is preferably an internet and cloud-based server. The server (4) includes all hardware that are provided in computers and servers such as a processor for performing all digital processes and a memory for storing the data. The server (4) can be programmed and allows running preferred operation systems and software therein. The images coming from the camera sets (2) to the server (4) are grouped by the server (4) according to timestamps which are proximate to each other. The server (4) is adapted to group images with proximate timestamps.

Preferably, a program running on the server (4) determines that frames with proximate timestamps are required to be grouped. The server (4) obtains the frame by grouping all color and depth images in the preferred millisecond range. According to the features of the camera set (2) and the image quality, the image capture time of the server (4) can be adjusted and the said time can be increased or decreased.

The three-dimensional media streaming and broadcasting method (100), which enables different environments, such as concerts and sports events, to be transmitted live and in three dimensions, and the transmitted image to be broadcasted and viewed with monitoring devices (5) such as virtual reality goggles, comprises the following steps:
  the server (4) grouping all the images coming from each camera set (2) within the same time interval in terms of depth and color, and upon grouping, generating the image frames (110),
  the server (4) computing the X, Y and Z axis coordinates of each pixel coming from the camera set (2), and creating the point cloud from the grouped pixels (120),
  after the point cloud is created, in accordance with the depth-sensing camera (2.1) chosen as reference, aligning the point clouds of the other depth-sensing cameras (2.1) by rotating them according to the reference depth-sensing camera (2.1), and combining all of the point clouds and obtaining the key point cloud for the first 3D key frame (130),
  the newly aligned and combined point cloud coming from the depth-sensing cameras (2.1) and the key point cloud for the 3D key frame are continuously renewed within a preferred time period; when a new point cloud comes from the depth-sensing cameras (2.1), 3D key frame renewal time is controlled; when the new point cloud comes, if a new 3D key frame is to be obtained (if the surface of the point cloud is to be constructed (mesh creation)), going to the next step, and additionally with the last 3D key frame generated asynchronously, going to step 190, or if a 3D key frame will not be generated and the old frame will be accepted, going to step 190 (140);
  if the coming point cloud is accepted as the key point cloud to generate the 3D key frame, filtering the point cloud respectively (150),
  constructing the surface of the filtered point cloud (mesh creation) (160),
  performing surface filtering of the point cloud whose surfaces are created (170),
  texturing the surface-filtered point cloud and broadcasting the image (180),
  if the new 3D key frame is not accepted, determining the skeleton information of the living organisms and objects moving on the key frame together with the joints by using the current point cloud via the artificial intelligence algorithms running on the server (4) (190),
  animating the living and the objects moving on the current key frame according to their joints, and broadcasting them for the monitoring devices (5) (200),
  as long as the event continues, returning to the first process step.

In the three dimensional media streaming and broadcasting system (1), timing of image sending, in other words capture processing of the camera sets (2) is very important, because when a camera set (2) captures images late at by a few milliseconds, the images do not overlap when they are grouped and integrated. In such a case, when the said delay occurs, a shift occurs in the images. For that reason, synchronous operation of the camera sets (2) and grouping and combining the images in the right time sets is very important. Since the images coming from the camera sets (2) come in a specific series (group) as a continuous flow, the frame that are close to each other (time frames) are grouped by the server (4). The server (4) groups all the images coming from each camera set (2) within the same time interval in terms of depth and color. The images coming from each camera set (2) have a time stamp and the said images can be grouped accurately by means of the time stamp. By means of the said grouping, image frames are generated. By means of grouping, the server (4) enables generation of the image frames.

Accurate grouping (4) performed by the server (4) is enabled by the synchronization policies provided and run in the server (4). The server (4) can group the images which are proximate in terms of time by means of the synchronization policies.

After the server (4) performs the grouping process, it creates the point cloud by using the depth images. The point cloud gives us the image in three dimensions. The image obtained in the point cloud is a three dimensional form of the image received from the camera set (2) comprised of points and the surface is not seen in the said point cloud image yet and since the image is viewed closely the spaces between the points are seen. The depth image contains depth information for each individual pixel. The camera set (2) transmits the depth information to the server (4) for each pixel in the image that it captures. The server (4) creates the point cloud using the depth information of each pixel present in the depth image and each camera set's (2) own camera intrinsic parameters. The server (4) is adapted to compute the X and Y axis coordinates of each pixel in horizontal and vertical axes by using the camera set (2) data such as focus land and principal point, and pixel depth information of each camera set (2). The server (4) creates the point cloud after computing the X, Y and Z axis (horizontal axis, vertical axis, depth axis) coordinates of each pixel coming from the camera set (2) (120). The server (4) creates a separate point cloud for each camera set (2).

Transferring the images captured during the event as a point cloud is very costly and very high processing power is required to process the said point cloud. With the present patent application, only the image and camera set (2) information are transmitted and the point cloud is created in the server (4). This way, image transfer can be achieved with lower capacity processors without occupying the communication line.

After generating the point cloud, the server (4) performs alignment/registration of the point cloud at the specified time interval (130). Since the camera sets (2) capturing the image of the scene (S) are positioned differently with respect to each other, if alignment is not performed, all point clouds overlap. The server (4) rotates the point clouds according to the location and position of the depth-sensing camera (2.1). The server (4) designates one of the camera sets (2) as the reference camera and positions the point clouds coming from the other camera sets (2) by rotating them relative to the reference camera set (2). While the server (4) is performing the alignment process, the process is performed by locating the common points detected by the depth-sensing camera (2.1) pairs, in other words both of the depth-sensing cameras (2.1). The server (4) performs the alignment process by overlapping the common points detected by the depth-sensing cameras (2.1) (130). The server (4) periodically performs the alignment/registration of the point cloud at the preferred time interval, thus, even if the position of the depth-sensing cameras (2.1) changes, for instance, even if one hits the camera sets (2), no shift occurs in the image (130).

After the alignment of the images coming from the depth-sensing cameras (2.1) is performed, a 3D key frame is obtained (140). Performing steps such as continuous refreshing of the 3D key frame (such as filtering and surface reconstruction on the point cloud in order to obtain a 3D key frame) occupies the server (4) processor too much. Therefore, in the invention of the present invention, a 3D key frame is obtained for a preferred period of time for example from the point cloud at every fifth second.

After this step, the method proceeds differently depending on whether the 3D (three dimensional) key frame is obtained from the point cloud or not. If the point cloud is accepted for generating the 3D key frame, the steps of point cloud filtering (150), mesh creation (160), surface filtering (170) and texturing (180) are performed respectively. If the point cloud is accepted for generating a 3D key frame every five seconds, these processes are performed once every five seconds. The time for accepting the point cloud to generate a 3D key frame may vary depending on factors such as the processing power and processing speed of the server (4), the size of the scene (S), and the content of the event. The said time can be determined by the system operators or software developers and stored in the server (4). The server (4) accepts the point cloud for generating the 3D key frame according to the said time set.

In the step of mesh creation (160), the surface of the filtered point cloud is reconstructed. For example, assuming that the camera sets (2) are capturing the image of a boxing match, the surface structure of the image of all moving and non-moving objects present in the scene (S) and the ring and the boxers is constructed in the step of mesh creation (160). In the mesh creation step 160, a three-dimensional surface reconstruction process is performed.

The most important feature of the three-dimensional media transmission and broadcasting system (1) and method (100) is the process of mesh creation (160) of the combined point cloud that is obtained after alignment of the point clouds coming from the camera sets (2) (130). Once the said mesh creation process is carried out, it is renewed within a specific time interval. For example, mesh creation is performed once every five seconds. The image, on which the said mesh creation is performed, is considered as the 3D key frame. In the image obtained after the mesh creation process, all moving living organisms and objects are animated.

The server (4) accepts the point cloud, whose mesh creation process (160) is completed, as the key frame for a preferred period of time. Since images are coming from the camera sets (2) continuously, it is not possible to perform mesh creation (160) of the coming point cloud at each millisecond in terms of the processing power. For this reason, when the server (4) generates a key frame, it uses this key frame for a preferred period of time. After the preferred time expires, a new 3D key frame is generated. The current key frame is used until a new key frame is generated. In the three-dimensional media streaming and broadcasting system (1) and method (100), a real-time 3D key frame is not generated continuously. Instead, a key frame is generated by performing mesh creation process (160) for example once every five seconds, and the objects and points moving for a period of five seconds in the last image, on which mesh creation is performed, are determined and those points are animated. The server (4) determines the skeleton information of the moving objects on the key frame by means of the artificial intelligence algorithms running thereon (190). The server (4) determines the skeleton structure of people, living organisms and objects moving on the 3D key frame. Thus, the skeleton structure of the moving living organisms and objects on the key frame are determined by the server (4) together with the skeleton structure joints, and the living organisms and objects are animated according to the said joints (200). By means of the said process steps, instead of animating the image coming from the camera sets (2) in real time; the image, on which mesh creation is performed, is taken and the living organisms and moving objects on the said image are determined, the skeleton structures of the said objects are determined, and the living organisms and the moving objects are animated according to the skeleton structure. The skeleton structure of the living organisms and moving objects is determined together with the joints. The joints show the points at which the living organisms and moving objects will move, and the movement of the living organisms and moving objects is realized from the said joints. When the server (4) generates the first 3D key frame from the point cloud (140), it detects all kinds of moving living organisms and objects on the image. The server (4) also determines the skeleton structure of any object in the point cloud that may be a living organism. By means of the algorithms running in the server (4), the server (4) can detect any and all kinds of moving objects in the point cloud and determine the skeleton structure of the object. The moving object may be a human or an animal or any kind of object. The server (4) determines the skeleton structure of the moving object together with the joints. Whether the server (4) generates a new key frame or not, it determines the type of movement made by the moving object from the new images coming from the camera set (2), and animates the movement of only the moving joints via the previous image.

Operation of the three dimensional media streaming and broadcasting system (1) and method (100) is as follows: Camera sets (2) are placed at the event venue where images will be captured. The camera sets (2) are arranged so as to surround the event venue, in other words the scene (S) for full 360° capture. The camera sets (2) capture the images from the scene (S). The camera sets (2) capture depth and color images from the event venue by means of the depth-sensing camera (2.1) and color camera (2.2). The said depth and color images are processed in the computing module (2.3). The camera sets (2) are preferably triggered by the server (4) to start capturing images and thus they are enabled to operate synchronously. The images captured by the camera sets (2) are received by the server (4). The server (4) synchronizes and groups the images coming from the camera sets (2) on a time-based manner and generates image frames (110). After the server (4) groups the camera set (2) images, it computes the X, Y and Z axis coordinates of each pixel coming from the camera set (2), and creates the point cloud (120). Then the server (4) performs alignment/registration of the point cloud coming from each depth-sensing camera (2.1). The server (4) performs the alignment process by overlapping the common points detected by the depth-sensing cameras (2.1) (130). The alignment of the first point cloud is always performed, and then realignment is performed within a preferred period of time (130). After the alignment process is performed, a single combined key point cloud which will create a 3D key frame is obtained. If the point cloud is accepted for generating the 3D key frame, the steps of point cloud filtering (150), mesh creation (160), surface filtering (170) and texturing (180) are performed respectively. Since it is very challenging for the processor to perform these processes in real time, the said processes are performed at a preferred time period, for example every five seconds. In the time period when these processes are not performed, the last image is taken and the skeleton information of the moving objects on the said image is determined (190). The server (4) determines the skeleton structure of the people, living organisms and objects moving on the point cloud. Thus, the skeleton structure of the moving living organisms and objects on the 3D key frame are determined by the server (4) together with the skeleton structure joints, and the living organisms and objects are animated according to the said joints (200). This way, there is no need to process the whole image, and thus only the moving objects in the last 3D key frame are moved according to the skeleton structure and only the moving images are broadcast. The server (4) processes the image received from the camera sets (2) in accordance with the method steps and broadcasts them, allowing them to be viewed via a preferred monitoring device (5).

The invention claimed is:

1. A method of three-dimensional streaming and broadcasting so as to enable an event to be streamed live such that a streamed image is viewable by a monitoring device, the method comprising:
   a) grouping all images from a camera set within a common time interval by a server, the grouping being by depth and color;
   b) generating image frames from the grouping;
   c) computing X, Y and Z axis coordinates of each pixel from a depth-sensing camera, the computing being by the server;
   d) creating a point cloud from grouped pixels;
   e) rotating images from other depth-sensing cameras according to the camera set with the depth-sensing camera as a reference, the rotating of the images being after the point cloud is created;
   f) aligning the point cloud so as to obtain a key point cloud required to generate a first three-dimensional key frame;
   g) continuously renewing the aligned point cloud from the depth-sensing cameras and the key point cloud for the three-dimensional key frame within a preferred time frame, wherein a renewal time of the three-dimensional key frame is controlled when a new point cloud comes from the depth-sensing cameras, going to steps h) and j) when a new three-dimensional key frame is to be obtained when a surface of the point cloud is to be constructed, going to steps k), l) and m) when a last three-dimensional key frame is generated synchronously, going to steps k) and l) if the three-dimensional key frame is not generated and a previous frame is accepted;
   h) filtering the point cloud if the point cloud is accepted as the key point cloud to generate the three-dimensional key frame;
   i) performing surface filtering of the point cloud having the constructed surface;
   j) texturing the surface-filtered point cloud and broadcasting the image;
   k) determining skeleton information of living organisms and objects moving on the last three-dimensional key frame together with joints if the new three-dimensional key frame is not accepted by using a current point cloud via an artificial intelligence algorithm running on the server;
   l) animating the living organisms and the objects moving on the current three-dimensional key frame according to the joints;
   m) broadcasting the animated living organism and the objects to the monitoring device; and
   n) returning to step a) as long as the event continues.

2. The method of claim 1, wherein step c) comprises:
   computing the X, Y and Z axis coordinates of each pixel by focus land and principal point data; and
   computing pixel depth information from the depth-sensing camera.

3. The method of claim 1, wherein step f) comprises:
   locating common points detected by a pair of the depth-sensing cameras; and
   performing the step of aligning by overlapping the detected common points.

4. The method of claim 1, wherein step g) comprises:
   generating the new three-dimensional key frame every two to five seconds; and
   using the last three-dimensional key frame within a time frame in which the three-dimensional key frame is not generated.

5. The method of claim 1, wherein the steps of filtering, surface creating, surface filtering and texturing are carried out in order so as to generate the new three-dimensional key frame from the point cloud images every two to five seconds.

6. The method of claim 1, wherein the step of determining skeleton information comprises:
   determining skeleton structure of the living organisms and objects moving on the three-dimensional key frame by use of the server.

7. The method of claim 1, wherein the step of animating comprises:
   moving only objects that are moving from the joints on the three-dimensional key frame by the server.

8. A three-dimensional media streaming and broadcasting system which enables an event to be streamed live and in three-dimensions and a three-dimensional image to be viewed by a monitoring device, the three-dimensional key frame media streaming and broadcasting system comprising:
   a plurality of camera sets adapted to capture the image from the event in three dimensions, the plurality of camera sets comprising:
      a depth-sensing camera adapted to receive depth information for each pixel, said depth-sensing camera capturing multiple pixel images up to thirty frames per second, said depth-sensing camera adapted to enable detection of depths of the images of the event and, of living organisms and objects in the scene separately for each pixel;
      a color camera adapted to capture a color image of the scene; and
      a computing module having GPU capability, said computing module adapted to capture and compress the depth and color images received from said depth-sensing camera and said color camera simultaneously, said computing module transmitting the depth and color images to a server via an Internet connection, wherein the server is adapted to generate image frame by grouping the depth and color images by depth and color from each of said plurality of camera sets within a common time interval, the server being adapted to compute X, Y and Z axis coordinates of each pixel coming from said plurality of camera sets so as to create a point cloud from grouped pixels, the server adapted to rotate images from other cameras of said plurality of camera sets according to a reference camera set, the server aligning the point cloud so as to obtain a first key frame, the server being adapted to continuously renew a key frame within a time period with new images from said plurality of camera sets, said server controlling whether the new images came within the time period, said server being adapted to create a surface of the point cloud when the new images are received if a new key frame is to be obtained, said server determining skeleton information of living organisms and objects moving on the key frame together with joints thereof if an old frame is accepted as the point cloud, said server animating the living organisms and objects moving on a current key frame according to the joints.

9. The method of claim 8, wherein said server is adapted to determining the skeleton structure via an artificial intelligence algorithm running on said server.

* * * * *